(12) United States Patent
Christiansen

(10) Patent No.: US 6,783,880 B2
(45) Date of Patent: Aug. 31, 2004

(54) POROUS PLANAR ELECTRODE SUPPORT IN A SOLID OXIDE FUEL CELL

(75) Inventor: Niels Christiansen, Gentofte (DK)

(73) Assignee: Haldor Topsoe A/S, Lyngby (DK)

( * ) Notice: Subject to any disclaimer, the term of this patent is extended or adjusted under 35 U.S.C. 154(b) by 246 days.

(21) Appl. No.: 09/776,385

(22) Filed: Feb. 2, 2001

(65) Prior Publication Data

US 2001/0012576 A1 Aug. 9, 2001

(30) Foreign Application Priority Data

Feb. 2, 2000 (DK) .......................................... 2000 00170

(51) Int. Cl.$^7$ .............................................. H01M 8/12
(52) U.S. Cl. ........................................... 429/33; 429/34
(58) Field of Search ..................................... 429/33, 34

(56) References Cited

U.S. PATENT DOCUMENTS

| | | | | |
|---|---|---|---|---|
| 5,589,286 | A |   | 12/1996 | Iwata ............................ 429/34 |
| 5,998,056 | A | * | 12/1999 | Divisek et al. ................ 429/41 |
| 6,048,636 | A | * | 4/2000  | Naoumidis et al. ........... 429/44 |
| 6,228,520 | B1 | * | 5/2001 | Chiao ............................ 429/32 |

FOREIGN PATENT DOCUMENTS

| | | | | |
|---|---|---|---|---|
| CH | 0515622   |   | 12/1971 | |
| EP | 0414270   |   | 2/1991  | |
| EP | 0722193 A | * | 7/1996  | ............ H01M/8/02 |
| EP | 0756347 A | * | 1/1997  | ............ H01M/8/02 |
| EP | 0785587   |   | 7/1997  | |
| EP | 0788175   |   | 8/1997  | |
| EP | 750798 B1 | * | 6/1999  | ............ H01M/2/14 |
| JP | 03055764  |   | 3/1991  | |
| JP | 03283266  |   | 12/1991 | |
| JP | 06338336 A | * | 12/1994 | ............ H01M/8/02 |
| JP | 08037011  |   | 2/1996  | |
| WO | WO9723007 |   | 6/1997  | |
| WO | WO9835398 |   | 8/1998  | |

OTHER PUBLICATIONS

S.C. Singhal, "Advances in Tubular Solid Oxide Fuel Cell Technology", pp. 195–207.
S. Primdahl, et al., "Thin Anode Supported SOFC", *Electrochemical Society Proceedings*, vol. 99–19, pp. 793–802.
H. P. Buchkremer, et al., "Advances in the Anode Supported Planar SOFC Technology", *Electrochemical Proceedings*, vol. 97–40, pp. 160–171.
M. Dokiya, et al., "Wet Process for Planar SOFC", *Proceedings of the International Symposium on Solid Oxide Fuel Cells*, vol. 2, Jul. 2, 1991, pp. 127–134.

* cited by examiner

Primary Examiner—Gregg Cantelmo
(74) Attorney, Agent, or Firm—Dickstein Shapiro Morin & Oshinsky LLP

(57) ABSTRACT

Solid oxide fuel cell with a planar support in form of a porous plate structure supporting on one planar surface a layer of electrode active material and with internally elongated gas supply channels formed inside the structure.

15 Claims, 2 Drawing Sheets

US 6,783,880 B2

POROUS PLANAR ELECTRODE SUPPORT IN A SOLID OXIDE FUEL CELL

BACKGROUND OF THE INVENTION

1. Field of the Invention

The present invention relates to solid oxide fuel cells, and in particular planar solid oxide fuel cells with electrode material supported on a support having integrated in its structure passageways for distribution of cell reactant gases.

2. Description of the Related Art

Presently, solid oxide fuel cells (SOFC) are mainly produced in two different designs in form of tubular types and flat planar types. The different fuel cell designs possess a number of advantages and disadvantages such as easy gas manifolding and structural reliability which has been demonstrated for the tubular types, whereas compactness and potential reduction of materials involved are the main advantages of the flat planar design. Very low voltage losses due to low area specific internal resistance can be obtained with the flat planar cell is stacked.

Recent development of thin supported electrolytes for the flat planar cell type in connection with improved electrode performance allows to lower the operation temperature from previously required 1000° C. operation temperature, which was typical for self-supported electrolyte cells, to a operation temperature of about 800° C. without any reduction in overall cell performance measured as area specific electrical power. Reduction of operation temperature makes it possible to use metallic bi-polar separation plates between the cells. Furthermore, metallic construction materials for the manifolds and heat exchangers leading to improved system reliability and reduced system price can be introduced. Examples of SOFC with thin electrolytes supported by the anode or cathode of the cells are disclosed in the literature (cf. Advances in the Anode Supported Planar SOFC Technology; H. P. Buchkremer et al., Electrochemical Proceedings, Vol. 97-18 (1997); Thin Anode Supported SOFC; S. Primdahl et al., Electrochemical Society Proceedings, Vol. 99-19 (1999); and, Advances in Tubular Solid Oxide Fuel Cell Technology; S. C. Singhal, Electrochemical Society Proceedings, Vol. 95-1 (1995)). Especially, the anode-supported thin electrolyte flat plate cell design has some important advantages including low contact resistance between the electrolyte and the anode in addition to simplified and cheaper manufacturing methods based on co-firing of cell components.

The anode structure is usually produced by tape casting a mixture of NiO and zirconia powder with a layer thickness of about 0.1 to 1 mm. A thin electrolyte layer is applied for on this anode support layer by spray moulding, dip moulding, layer casting or electrophoretic deposition. The thickness of the thin electrode is typically 10–50 $\mu$m. During the final firing of the thus obtained multi-layer structure, the anode layer becomes porous with an open porosity in the range of 30–60%, whereas the electrolyte layer densities to a gas-tight material, while a three-phase boundary (anode-electrolyte-porosity) is established in which the anode electro catalytic reaction takes place. Reaction rate of electrode reactions is limited by transport of fuel gas and gaseous reaction products through the porous anode structure. The characteristics of the three-phase boundary and the anode porosity therefore take part in the total voltage polarisation of the cell. One solution to this problem is to subdivide the anode into a thin active anode layer with a typical thickness of 1–50 $\mu$m and an anode support and current collecting layer with a typical thickness of 50–1000 $\mu$m, basically consisting of the same mixture of NiO and zirconia. However, this configuration still fails to fulfil a required effective gas supply through the porous open structure together with a highly mechanically stable support for the electrolyte layer. Furthermore, problems with effective mechanical and electrical contact between the porous anode support layer and the bi-polar plates containing the anode gas supply channels still remain to be solved. A number of attempts have been made in the past to improve electrical contact by application of nickel felt in between the anode support layer and the metallic bi-polar plate. Gas supply channels may be formed by machining grooves into the solid metallic bi-polar plate. The above solutions are expensive and not useful in commercial use of SOFC technology.

SUMMARY OF THE INVENTION

In general, this invention is an improved SOFC, which integrates the gas supply channels with the cell support and the anode layer. Furthermore, the inventive SOFC makes it possible to produce large cell areas based on cheap manufacturing and materials.

DETAILED DESCRIPTION OF THE PREFERRED EMBODIMENTS

Figure 1:
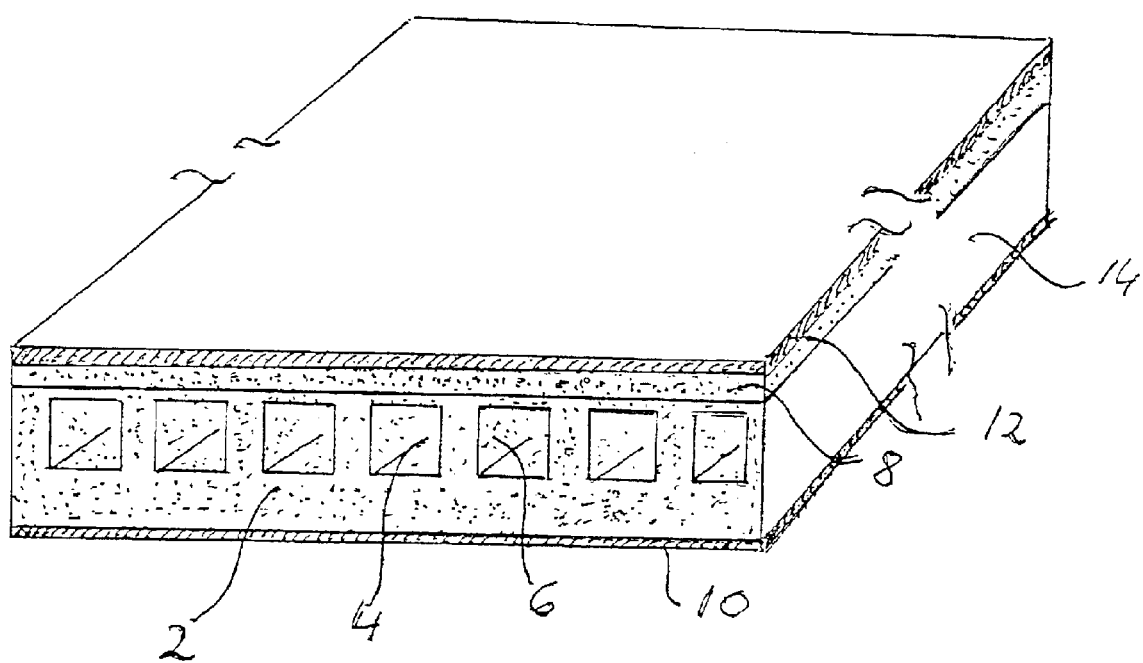
FIG. 1 is a perspective sectional view of a segment of a solid oxide fuel cell of the present invention.

A specific embodiment of a support element of the SOFC according to the invention is shown in FIG. 1. The shown SOFC consists of a porous flat plate 2 containing a number of channels running perpendicular to a cross section of the plate being surrounded on all longitudinal sides by porous walls. The plate's length, width and thickness define the dimension of the flat plate element, where the length is larger than or equal to the width, and the width is larger than or equal to the thickness. The cross section area of the element is defined by the width and the thickness, whereas the planar area is defined by the length and the width. The channels are running parallel to the length of the element. On one of the planar sides of the porous elements, anode layer 8 is deposited as a thin porous layer. The opposite planar side of the porous element is covered by a dense layer 10. On top of the porous anode layer a thin dense electrolyte layer 12 is deposited.

Figure 2:
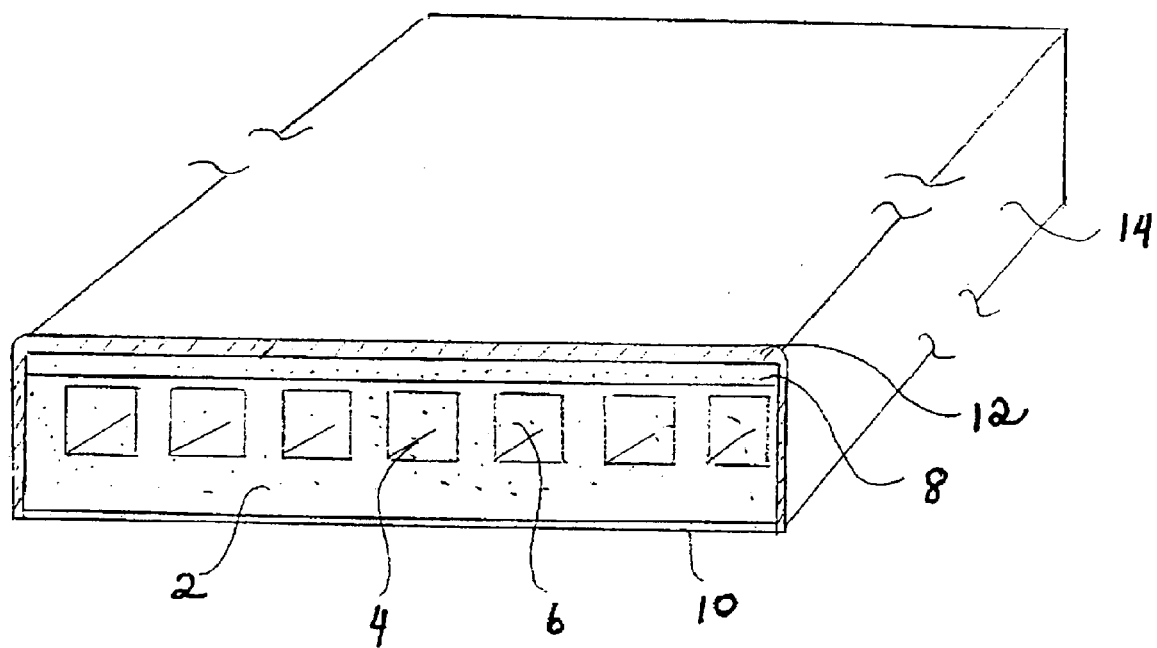
FIG. 2 is a perspective sectional view of a segment of a solid oxide fuel cell of the present invention with a thickness defined by a rim.

In a further embodiment, the dense electrolyte layer also covers the rim 14 of the porous elements or solely the rims which are parallel with the elongated gas channels, as shown in FIG. 2.

Still in an embodiment, the dense electrolyte covers one of the planar sides, whereas the rim or part of the rim is gas impermeable.

The porous element with its longitudinal internal gas channels may be produced by extrusion. The layers deposited on the porous element may be produced by deposition methods like co-extrusion, spray moulding, thermal spraying, dip moulding, printing, casting, laminating, electrophoretic deposition, precipitation deposition, electrochemical deposition and chemical vapour deposition.

Containing the fuel gas channels while acting as support for the anode and the dense electrolyte, the porous element is exposed to reducing gas conditions under fuel cell operation which allows use of material such as ferritic stainless steel, nickel based alloys and high chromium alloys. Based on such metallic materials, the porous element obtains substantially improved mechanical properties and high thermal conductivity ensuring high performance of the fuel cell system, even when large cell dimensions are realised. The thin deposited layers, which penetrate a part of the porous support element become an integrated part of this element and contributes to the high stability and high cell performance. Due to the dimensional stability and rigidity of the porous support element, co-firing of the thin deposited layers is allowed, and larger thermal expansion mismatch between the actual materials is tolerated than in the known cell designs. This cell concept improves the thermal cycling and red-ox stability of the anode and anode current collection layers, since the amount of total nickel content in these layers has been reduced significantly in comparison with known anode-supported SOFC. Furthermore, tight mechanical and physical contact between the different layers may be maintained during thermal cycling and red-ox cycling.

Interpenetrating of the thin deposited layers on the anode side of the porous support element as well as on the opposite cathode side is decisive for a sufficient electrical and mechanical contact at the interplanes. This is in particular important during thermal cycling of the cell stack and under internal reforming conditions, where large thermomechanical stresses can be tolerated by the porous plate-supported solid oxide fuel cell. The thin dense layer on the cathode side of the porous plate element protects the porous metallic material from oxidation and separates the anode gas from the cathode gas.

The dense layer may be based on mixed oxide ceramic materials, which then penetrate into the surface pores of the porous plate element and form an integrated composite interphase structure. Expansion and cracking of these types of ceramic materials, which appear in the traditional thick plate and ceramic bi-polar plates of the known SOFC, are thus eliminated. Furthermore, an effective electrical contact between the anode current collection layer and the cathode current collection layer is established in the mixed ceramic metallic interphase structure.

The pores in the porous support element may be impregnated with a catalyst for internal reforming or internal partial oxidation of carbonaceous fuel gasses.

Gasses being introduced into the fuel cell electrodes may contain particles contained in the feed gas or from the fuel processing system. It is well known that cell performance degrades over time when particulate impurities are deposited at the electrode surfaces during cell operation.

A further advantage of the inventive fuel cell is that the porous plate with its internal gas channels has the function of a particulate trap or filter preventing particulate matter from entering the electrode area, where the electrode reaction takes place.

The fuel cell of the invention is therefor particularly useful in operation with feed gases containing dust or other particulate matter.

Owing the metallic nature of the porous support element bonding methods such as soldering and welding can be used to manifold the elements or to connect a number of elements in order to make larger cell structures. The planar geometry of the porous support element with its deposited thin anode and electrolyte layer and cathode barrier layer enables this structural element to be repeated, sequentially forming a layered fuel cell stack with minimal internal electrical resistance and maximal structural stability.

The thickness of each porous support plate element is typically in the range from 2 mm to 30 mm, preferably, from 4 mm to 6 mm, the gas channels in the porous support plate elements have cross sectional areas from 0.5 $mm^2$ to 1000 $mm^2$, preferably from 2 $mm^2$ to 20 $mm^2$. The porosity of the porous support plate element is from 20 vol % to 90 vol %, preferably, 30 vol % to 70 vol %. The mean pore size of the porous support plate element is in the range from 0.1 $\mu$m to 500 $\mu$m, preferably, from 1 $\mu$m to 50 $\mu$m.

EXAMPLE 1

Ferritic stainless steel with powder, the composition Fe22Cr and a mean powder particle size of 100 $\mu$m are mixed in a pug mill with 6 vol % methylcellulose and 44 vol % water followed by extrusion of the paste into a long planar element with the cross-sectional dimension 5×150 mm and with 37 internal longitudinal channels with the cross-sectional dimension 3×3 $mm^2$. Each gas channel is surrounded by longitudinal walls with a wall thickness of 1 mm. The thus obtained extruded profiles are cut into lengths of 300 mm in the green stage followed by drying to remove the water content.

The dried porous plates are spray-painted on one planar surface with a stabilised slurry consisting of a mixture of NiO powder and zirconia powder doped with 8 mole % yttria in an organic solvent suitable for use in traditional spray painting equipment. The layer is deposited in an even layer thickness of 10 $\mu$m and dried. A further layer consisting of pure fine-grained, well-dispersed suspension of zirconia doped with 8 mole % yttria is then spray-painted on the first layer in an even thickness of 5 $\mu$m.

The opposite planar surface of the porous support plate element is spray-painted with a well-dispersed powder suspension containing fine powder of lanthanum chromite doped with strontium and nickel. The layer thickness of this layer is 5 $\mu$m. After drying the spray procedures is repeated one more time.

Finally, the coated element is sintered in hydrogen atmosphere at 1250° C.

What is claimed is:

1. Solid oxide fuel cell with a planar support in form of a porous metal and/or metal alloy plate structure made from ferritic stainless steel nickel-based alloys and/or high chromium alloys, the plate structure in contact with and directly supporting on one planar surface a layer of anode active material and with internally elongated fuel gas supply channels formed inside the structure.

2. Solid oxide fuel cell of claim 1, wherein a planar surface on an opposite side to the surface supporting the anode active material is provided with a dense layer of gas impermeable and electronic conductive material.

3. Solid oxide fuel cell of claim 2, wherein the dense layer is a ceramic and/or metallic layer.

4. Solid oxide fuel cell of claim 1, wherein the anode layer is active in electrochemical anode reactions and wherein the layer is covered by a dense layer of electrolyte material.

5. Solid oxide fuel cell of claim 1, wherein the porous place has a gas impermeable rim.

6. Solid oxide fuel cell of claim 1, wherein the porous plate has a rim which supports a dense layer of electrolyte material.

7. Solid oxide fuel cell of claim 1, wherein the porous structure is impregnated with a catalyst.

8. Solid oxide fuel cell of claim 1, wherein particulate matter containing gas is fed from the fuel gas supply channels for generation of power.

9. Solid oxide fuel cell of claim 1, wherein a planar surface on an opposite side to the surface supporting the anode active material is provided with a dense layer of gas impermeable and electronic conductive material.

10. Solid oxide fuel cell of claim 4, wherein the dense layer is a ceramic layer.

11. Solid oxide fuel cell of claim 1, wherein the anode layer is active in electrochemical anode reactions and wherein the layer is covered by a further dense layer of electrolyte material.

12. Solid oxide fuel cell of claim 5, wherein the porous plate is made from ferritic stainless steel, nickel-based alloys and/or high chromium alloys.

13. Solid oxide fuel cell of claim 6, wherein the rim of the porous plate is gas impermeable.

14. Solid oxide fuel cell of claim 7, wherein the porous plate has a run which supports a dense layer of electrolyte material.

15. Solid oxide fuel cell of claim 2, wherein the porous structure is impregnated with a catalyst.

* * * * *